Figure 6:
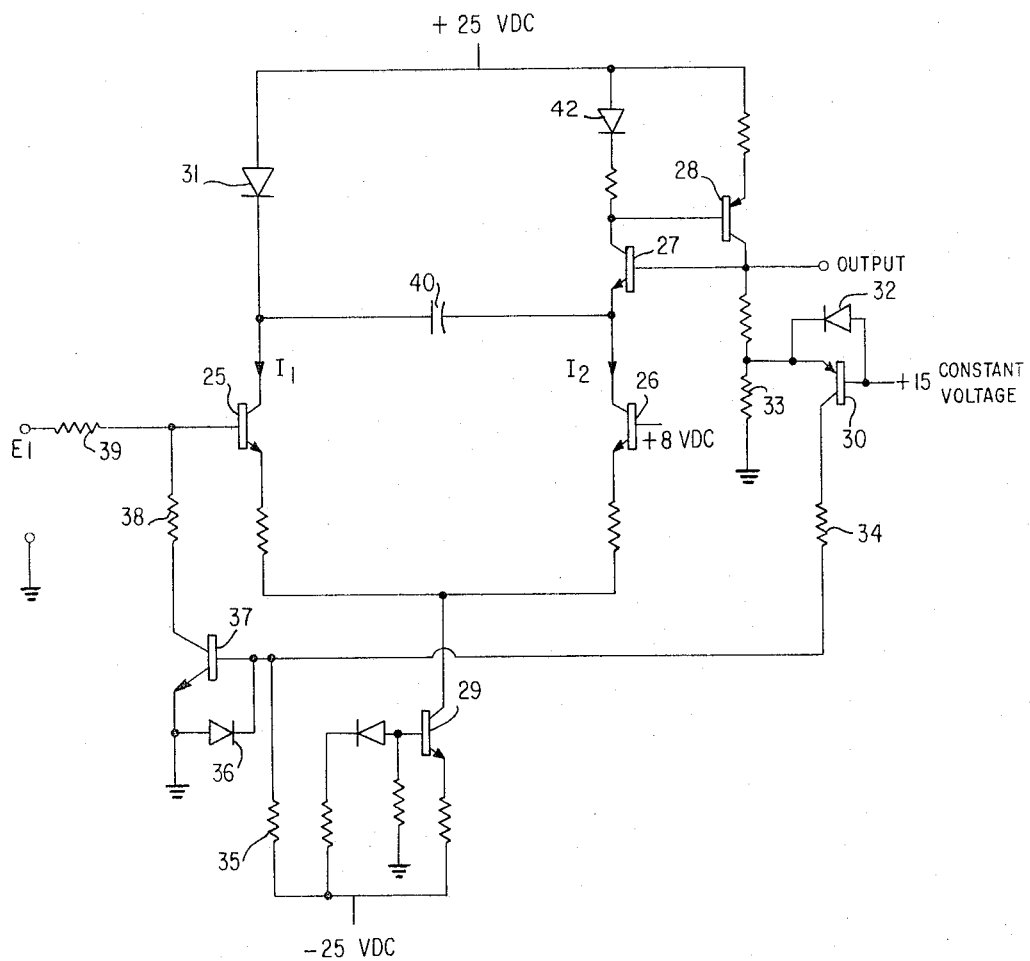

Jan. 3, 1967  R. A. SCHAEFER  3,296,556
PULSE DUTY RATIO MODULATOR
Filed Sept. 21, 1962  3 Sheets-Sheet 1
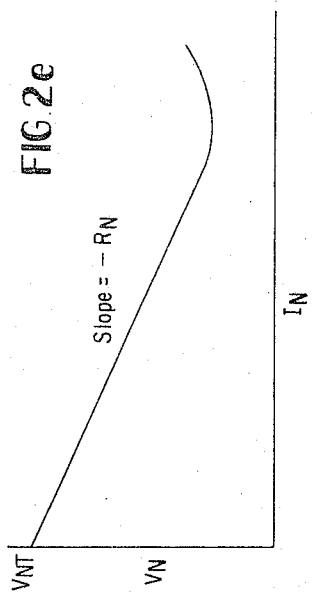
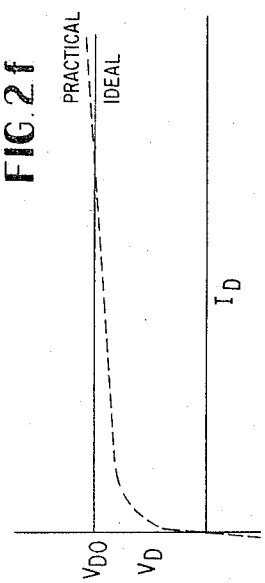
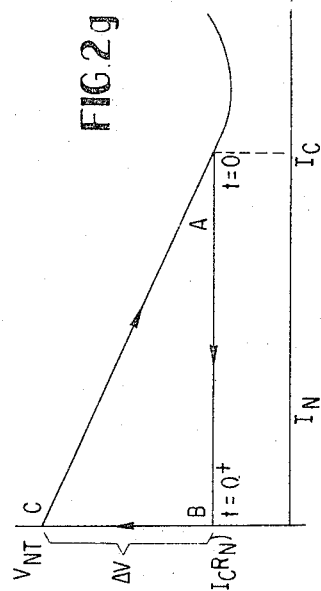
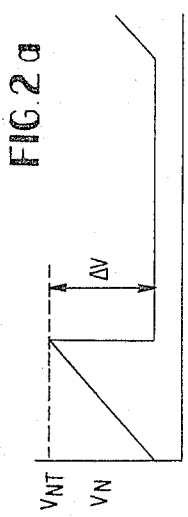
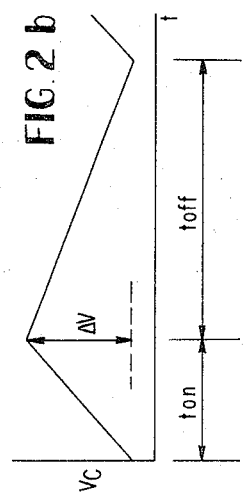
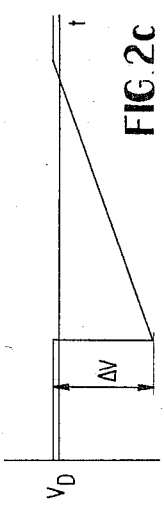
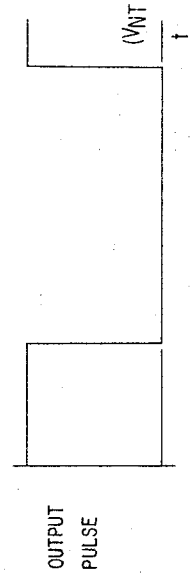
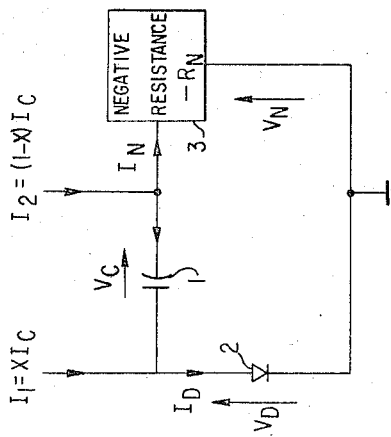
INVENTOR.
R. A. SCHAEFER
BY
Sughrue, Rothwell, Mion & Zinn
ATTORNEYS

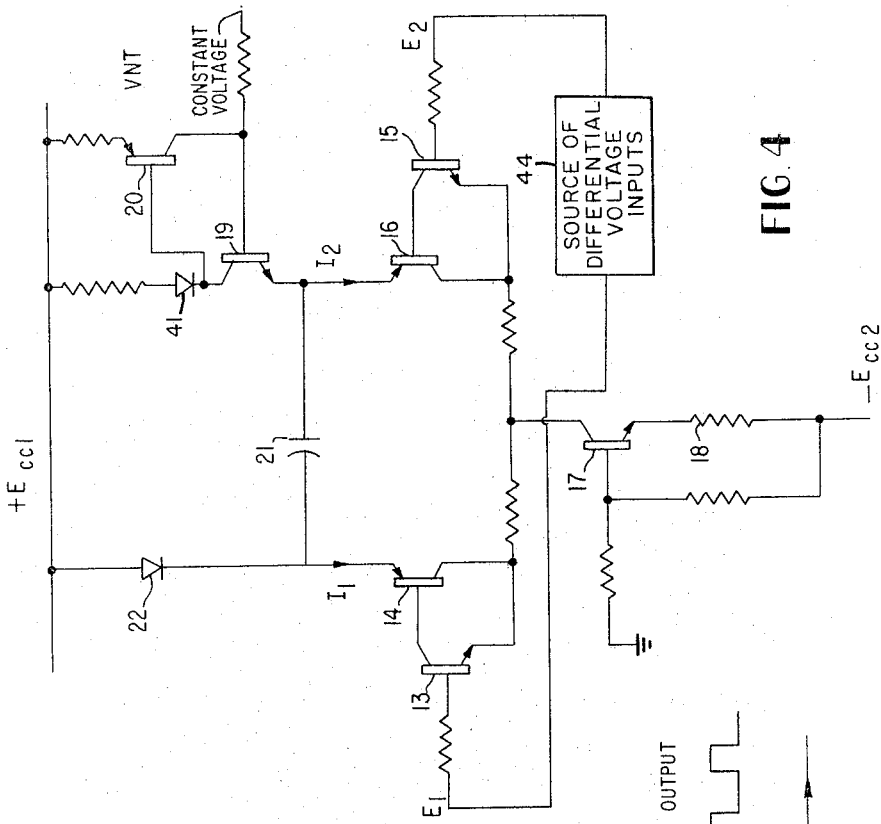
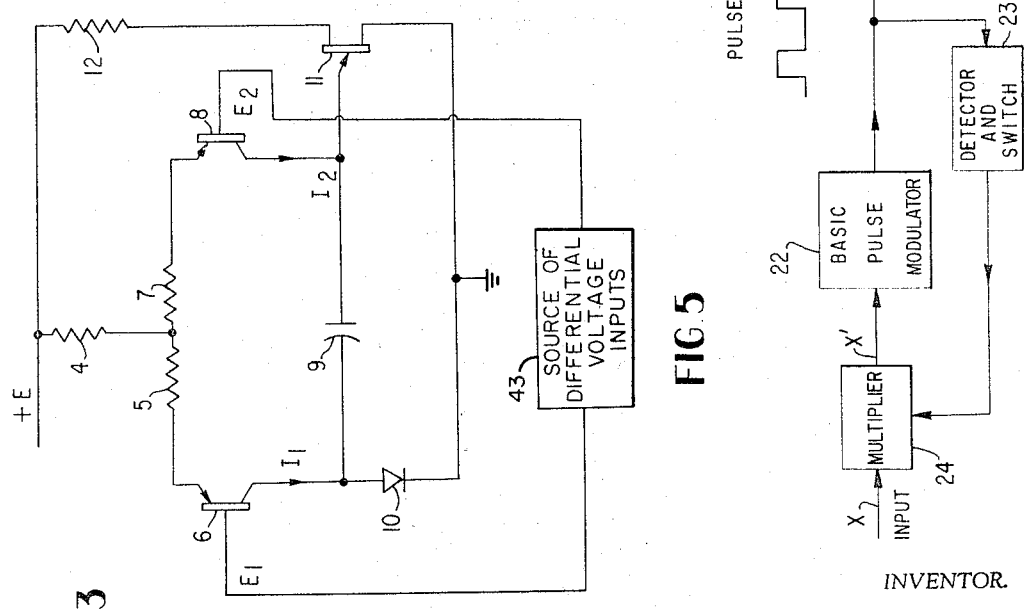

Jan. 3, 1967  R. A. SCHAEFER  3,296,556
PULSE DUTY RATIO MODULATOR
Filed Sept. 21, 1962  3 Sheets-Sheet 3

INVENTOR.
R. A. SCHAEFER
BY
Sughrue, Rothwell, Mion & Zinn
ATTORNEYS

United States Patent Office 3,296,556
Patented Jan. 3, 1967

3,296,556
PULSE DUTY RATIO MODULATOR
Richard A. Schaefer, Timonium, Md., assignor to Martin-Marietta Corporation, Baltimore, Md., a corporation of Maryland
Filed Sept. 21, 1962, Ser. No. 225,271
12 Claims. (Cl. 332—9)

This invention relates to pulse duty ratio modulators and more particularly to a modulator producing pulses having a width and a repetition rate which are modulated in accordance with an input signal.

In many applications it is desirable to produce a train of constant amplitude pulses having a D.C. or time-average value which is proportional to a D.C. input. As an example, a pulse train may be used to excite a load device such as a motor winding, a relay coil, a D.C. meter or a heater. If the pulse frequency is sufficiently high, the response of the load device to the pulse train will be the same as if a continuous D.C. signal were applied. A pulse modulator which accepts a D.C. input signal and produces a pulse train output can be used in such applications. Such a modulator is useful in other applications requiring D.C. amplification. The D.C. input signal is applied to the modulator which produces a train of pulses having an average D.C. level proportional to the D.C. input voltage.

Prior art modulators have employed the technique of varying the output pulse width or varying the output pulse repetition rate in order to vary the average D.C. level of the output pulses. Both pulse width modulators and pulse frequency modulators have serious limitations. Both require an infinite band width in order to reproduce a pulse train over the complete range of output modulation. In a pulse width modulator, the pulse width must approach zero as the pulse train duty ratio approaches zero. The generation of pulses having a width approaching zero requires infinite bandwidth. In both pulse frequency and pulse width modulators, the bandwidth required approaches infinity as the pulse train duty ratio approaches unity because the off time of the pulses becomes quite small.

Accordingly, it is an important object of the present invention to provide an improved modulator which is not subject to critical bandwidth limitations.

A key problem in fully exploiting the possible advantages of the pulse techniques described above is that of obtaining a modulator which controls the duty ratio with sufficient accuracy. One of the simplest methods of generating a pulse train is to use a form of relaxation oscillator. However, known prior art oscillators are not capable of controlling both pulse width and repetition rate with sufficient accuracy for use in most pulse applications.

Accordingly, it is another object of the present invention to provide an improved relaxation oscillator for use in a pulse duty ratio modulator.

It is a further object of the present invention to provide an improved modulator which provides a control over the full range of an input signal corresponding to a full range of pulse train duty ratio between zero and unity.

It is a further object of the present invention to provide a modulator which produces an output of the optimum pulse frequency for any desired duty ratio output.

It is a further object of the present invention to provide an improved modulator in which the duty ratio of the output is proportional to a differential input.

It is a further object of the present invention to provide a modulator which controls the pulse width, the pulse frequency and the pulse duty ratio in a manner non-linearly related to the input signal.

In accordance with one embodiment of the invention, the modulating input signal is a differential signal including a constant current source having two current outputs which are complementary. That is, when one of the outputs increases, the other decreases and the sum of the outputs is always constant.

A relaxation oscillator including a negative resistance device, a capacitor, and a diode which is connected to provide a constant voltage drop for a variable current flow is provided. The relaxation oscillator has two operating states. In one state there is substantial current flow through the negative resistance and no current flow through the diode; in the other state there is substantial current flow through the diode and no current flow through the negative resistance.

The complementary outputs of the current source are applied to the diode and to the negative resistance device. The magnitudes of these currents determine the charging times of the capacitor which in turn determine the time periods that the oscillator remains in each of the two conditions. In this manner, the duty cycle of the oscillator is controlled by the differential input signal.

The foregoing and other objects, features and advantages of the invention may be better understood from the following more detailed description and appended claims taken in conjunction with the drawings, in which:

FIGURE 1 shows an idealized representation of the relaxation oscillator;
FIGURE 2a shows the voltage across the negative resistance device;
FIGURE 2b shows the voltage across the capacitor;
FIGURE 2c shows the voltage across the diode;
FIGURE 2d shows the output;
FIGURE 2e shows the negative resistance characteristics of the negative resistance device;
FIGURE 2f shows the diode characteristics;
FIGURE 2g shows the negative resistance operating characteristics;
FIGURE 3 shows a simple practical pulse modulator circuit;
FIGURE 4 shows the pulse modulator circuit in its preferred form;
FIGURE 5 shows a block diagram of another embodiment of the invention; and
FIGURE 6 shows a circuit diagram of the embodiment shown in block form in FIGURE 5.

By way of introduction, it will be shown mathematically that a differential input provides the best approach to obtaining the desired control of the duty cycle.

The D.C. signal information carried by a pulse train is given by:

$$E_o = E_p T_w f_p \tag{1}$$

where $E_p$ is the peak pulse amplitude, $T_w$ is the pulse width and $f_p$ is the pulse repetition frequency. $E_o$ is the steady state average value of the pulse train. In a pulse modulator the product $T_w f_p$, or duty ratio, may be controlled so that it is proportional to the input signal $E_i$ and therefore:

$$T_w f_p = k E_i \tag{2}$$

One problem of implementing these equations is reducing the bandwidth required in order to reproduce the pulse train over the complete range of duty ratios, $$0 \leq T_w f_p \leq 1$$

It is convenient to normalize the variables of Equations 1 and 2, allowing:

$$\frac{E_o}{E_p} = Y = \text{the duty ratio of the output} = T_w f_p \quad (3)$$

and
$$kE_1 = X \quad (4)$$

The pulse modulator is to be implemented with a relaxation oscillator having an "on" and "off" time. In terms of these "on" and "off" times, $$Y = \frac{t_{on}}{t_{on} + t_{off}} \quad (5)$$

The timing of the pulses in the relaxation oscillator is governed by the charging or discharging of a capacitor. Assuming that the current flow through the capacitor during charging is independent of the capacitor terminal voltage, the pulse "on" and "off" times can be written:

$$t_{off} = \frac{C_1 \Delta V_1}{I_1} \quad (6)$$

$$t_{on} = \frac{C_2 \Delta V_2}{I_2} = T_w \quad (7)$$

where $C_1$ and $C_2$ are the timing capacitance values and $\Delta V_1$ and $\Delta V_2$ are the changes in capacitor terminal voltage during the time intervals. Substitution of Equations 6 and 7 into Equation 5 yield the requirement that:

$$\begin{array}{ll} Y=0 & Y=1 \\ \frac{C_1}{C_2}\frac{\Delta V_1}{\Delta V_2}\frac{I_2}{I_1}=\infty & \frac{C_1}{C_2}\frac{\Delta V_1}{\Delta V_2}\frac{I_2}{I_1}=0 \end{array}$$

The only practical solutions are $\Delta V_2$ or $I_1$ equal to zero for $Y=0$ and $\Delta V_1$ or $I_2$ equal to zero for $Y=1$. Therefore, to avoid the bandwidth problem mentioned above, the control of the pulse timing must be by control of the currents $I_1$ and $I_2$, as seen from (6) and (7), so that neither $t_{on}$ nor $t_{off}$ approach zero.

If we let $C_1 = C_2$ and $\Delta V_1 = \Delta V_2 = \Delta V$ for simplicity, then the duty ratio is $$Y = T_w f_p = \frac{I_1}{I_1 + I_2} \quad (8)$$

$I_1$ and $I_2$ are to be functions of X, i.e., $I_1(X)$ and $I_2(X)$. From (1), (2), (3), and (4), the required operating law may be $$Y = X \quad (9)$$

so that $$X = \frac{I_1(X)}{I_1(X) + I_2(X)} \quad (10)$$

is the relation which must be accurately mechanized. The problem now is that of finding the most suitable functional relations for $I_1$ and $I_2$.

For good results, $I_1$ and $I_2$ must follow a natural law which lends itself to accurate mechanization with realizable circuits. An obvious choice is $$I_1(X) = a_1 X + b_1 \quad (11)$$
$$I_2(X) = a_2 X + b_2 \quad (12)$$

since, through the use of linear feedback, these can be mechanized with great precision. Substitution of (11) and (12) into (10) yields the solution $$a_1 = -a_2 = b_2 = I_c, \text{ a constant}$$
$$b_1 = 0 \quad (13)$$

so that (11) and (12) become $$I_1 = X I_c \quad (14)$$
$$I_2 = (1-X) I_c \quad (15)$$

so that (9) is satisfied and the pulse width and pulse repetition frequency are $$T_w = \frac{C \Delta V}{I_c(1-X)} \quad (16)$$

$$f_p = \frac{I_c X(1-X)}{C \Delta V} \quad (17)$$

These can also be written $$T_w = \frac{(T_w)_{\min}}{(1-X)} \quad (18)$$

$$f_p = 4X(1-X)(f_p)_{\max} \quad (19)$$

where $$(T_w)_{\min} = \frac{C \Delta V}{I_c}$$

and $$4(f_p)_{\max} = \frac{I_c}{C \Delta V}$$

From the above expressions, it can be seen that a modulator can be implemented using physically realizable circuits.

The basic modulator circuit providing the characteristics given by (9), (18) and (19) is shown in simplified form in FIGURE 1. The oscillator includes two current sources, $I_1$ and $I_2$, which are related to the input X as required by the previous equations. The circuit also includes a capacitor 1, a diode 2 and a negative resistance 3 which provides a negative resistance characteristic over a suitable range.

The negative resistance characteristics of the negative resistance 3 are shown in FIGURES 2e and 2g. The diode 2 provides an approximately constant voltage drop for positive current flow regardless of the magnitude of the current flow through the diode. The voltage-current characteristics of the diode are shown in FIGURE 2f.

The operation of the circuit can be explained by assuming initially that $I_1=0$ and $I_2=I_c$ and that all of $I_2$ flows into the negative resistant 3. Referring to FIGURE 2g, the negative resistance device is operating at the point A which represents full current flow through the negative resistance device. The voltage across the diode 2 is approximately equal to $V_{D0}$ as shown in FIGURE 2f. This voltage across the diode is produced by any small or practically infinitesimal amount of $I_1$ or leakage current through the capacitor 1. However, $I_1$ and the current $I_c$ flowing through the capacitor are assumed initially to be held to zero.

Assume a step input in X at time $T=0$ so that $I_1$ becomes $X I_c$ and $I_2$ is reduced from $I_c$ to $(1-X)I_c$. The diode voltage remains $V_{D0}$. Due to the action of the capacitor, the voltage at the terminals of the negative resistance is momentarily clamped by the diode and the capacitor to its initial value. However, the current into the negative resistance has been instantaneously reduced by $X I_c$ and this reduction in current flowing through the negative resistance would ordinarily increase the voltage across the negative resistance. However, since the voltage across the negative resistance is clamped at its initial value, the operating point of the negative resistance must instantaneously switch from point A, FIGURE 2g, to point B. The condition at point B is that the current through the negative resistance equals zero, so that $I_2$ flows into the capacitor 1. The voltage across the capacitor begins to increase due to the charging of the capacitor 1. This is represented by operation along trajectory B–C of FIGURE 2g. When the voltage across the negative resistance 3 reaches $V_{NT}$, current again begins to flow through the negative resistance.

However, as current flow begins in the negative resistance, there is a tendency for the voltage across the negative resistance to drop. Due to the action of the capacitor 1, the diode voltage $V_D$ must also be reduced. However, a reduction of the voltage across the diode to a value below $V_{D0}$ requires that the current through the diode go to zero. This occurs and all of the current then flows through the negative resistance 3. The result is an instantaneous switching of the operating condition of the negative resistance 3 from the point C, FIGURE 2g, to the point A. At this point, all of $I_1$ is flowing into the capacitor 1 and is charging that capacitor. As the voltage across the capacitor 1 increases, the voltage increases to the voltage $V_{D0}$. At this point, the diode 2 can again conduct. When the diode 2 conducts, there is a small decrease in the current flowing into the negative resistance 3. This small decrease in the current flowing through negative resistance 3 tends to decrease the voltage drop across negative resistance 3. Since this voltage is clamped by the diode and cannot decrease, there is an instantaneous switching of the negative resistance device from operation at point A, FIGURE 2g, to point B. Thus, the cycle previously described is begun again.

Summarizing, there are two timing cycles and two instantaneous switching cycles in the modulator operation. Referring to FIGURE 2g, there is instantaneous switching from point A to point B. There is a timing cycle which takes the operating point from point B to point C in a time determined by the time required for $I_2$ to charge the capacitor 1 to a voltage equal to the voltage at which the negative resistance begins to conduct. There is instantaneous switching from operating point C to operating point A and there is a dwell at point A for a time determined by the time required for $I_1$ to charge capacitor 1 to a voltage $V_{D0}$ at which the diode 2 begins to conduct.

The current through the negative resistance can be taken as the output of the modulator as shown in FIGURE 2d. When the current through the negative resistance equals zero, the modulator output is considered to be "on" and when the current through the negative resistance equals $I_c$, the modulator is considered to be "off." The time that the modulator is "on" is determined by the capacitance of 1, the resistance of negative resistance 3 and the magnitude of the input currents as follows:

$$t_{on} = \frac{CR_N}{(1-X)}$$

Similarly, the time that the modulator is "off" is given by:

$$t_{off} = \frac{CR_N}{X}$$

Since $T_w = t_{on}$ and $$f_p = \frac{1}{t_{on} + t_{off}}$$

these quantities are given by $$T_w = \frac{CR_N}{1-X}$$

$$f_p = \frac{X(1-X)}{CR_N}$$

The duty cycle of the modulator, the product of the two above quantities, is thus proportional to the input X.

A practical circuit for implementing the principles shown in FIGURE 1 is shown in FIGURE 3. It will, of course, be understood that various other circuits may be used to implement the principles of this invention. The circuit of FIGURE 3 includes an approximate constant current source supplied through the resistor 4. This constant current is divided into two branches which flow through resistor 5 and transistor 6 and through resistor 7 and transistor 8. $E_1$ and $E_2$ are complementary input voltages emanating from source 43. The two currents at the respective collectors of transistors 6 and 8 represent the complementary input currents $I_1$ and $I_2$ of FIGURE 1. Either a reduction of $E_1$ or an increase of $E_2$ results in an increase of $I_1$ and therefore a higher pulse train duty ratio.

The currents $I_1$ and $I_2$ charge the capacitor 9 and determine the timing cycles of the modulator. These timing cycles include substantial or negligible current flow through diode 10 and substantial or negligible current flow through the negative resistance device which in this circuit is the double-base diode 11. The current flow through double-base diode 11 also flows through the load resistor 12 and provides the output of the modulator.

The performance of the circuit shown in FIGURE 3 can be improved in several ways. Of course, one of these is to replace the double-base diode 11 with a more ideal negative resistance. The circuit performance can also be improved by replacing the constant current source, the voltage $+E$ and the resistor 4 in FIGURE 3, with a common base transistor current source. The substitution of a direct coupled complementary pair of transistors for each of the transistors 6 and 8 also results in better circuit operation. Finally, the circuit should be temperature compensated to minimize current variations. These improvements are all shown in the circuit of FIGURE 4.

Referring to FIGURE 4, the input voltage $E_1$ is applied to the base of transistor 13 which is coupled to the complementary transistor 14. Similarly, the input voltage $E_2$ is applied to the base of transistor 15 which is coupled to the complementary transistor 16. If $E_1$ and $E_2$ are differential signals proportional to the input X and the sum of the currents $I_1$ and $I_2$ flowing through the two differential pairs 13–14 and 15–16 is constant, then the currents $I_1$ and $I_2$ are as follows as required for operation of the system:

$$I_1 = XI_c$$
$$I_2 = (1-X)I_c$$

where $I_c$ is the constant current flow.

The sum of the currents $I_1$ and $I_2$ is maintained constant by the transistor 17 which is connected in a constant current configuration. It can be seen that increased current flow through the transistor 17 results in a greater voltage drop across resistor 18. This voltage drop is connected back to the base of transistor 17 and when the base goes more negative with respect to the emitter, the transistor tends to cut off thereby decreasing the current flow and maintaining this flow constant. The operation of transistor 17 is similar when there is a tendency for the current flow through the transistor to decrease.

In the circuit of FIGURE 4, the negative resistance is implemented with the two transistors 19 and 20. The current flow through transistor 19 increases as the voltage at the emitter of transistor 19 decreases in the manner depicted in FIGURE 2e. The transistors 19 and 20 are coupled collector-to-base to provide the negative resistance characteristic. The timing capacitor 21 and the diode 22 perform the same function as that described in conjunction with previous circuits.

The operation of the circuit of FIGURE 4 is as follows. Assume initially that there is substantial current flow through transistor 19 and negligible current flow through diode 22. As the capacitor is charged, the voltage across the capacitor 21 gradually reaches the point at which the diode 22 can again conduct. When diode 22 starts to conduct, the current through transistor 19 must decrease slightly. This slight decrease in current is accompanied by a rise in the voltage at the collector of transistor 19. This positive-going voltage is connected to the base of transistor 20 and tends to cut that transistor off. This decreases the voltage at the collector of transistor 20 and this negative-going voltage is connected to the base of transistor 19 tending to cut it off further. This regenerative feedback results in a fast switching of the transistors 19 and 20 to their nonconducting state.

Now all of the constant current maintained by transistor 17 is flowing through diode 22. The capacitor 21 is charged toward a voltage at which the transistor 19 can again conduct. When this voltage is reached, transistor 19 conducts incrementally thereby tending to increase the voltage at the emitter of transistor 19. The voltage at the emitter of transistor 19 is coupled through the capacitor 21 to the diode 22. Since the voltage drop across the capacitor 21 cannot change instantaneously, the current flow through the diode 22 must drop to zero. All of the constant current now flows through transistors 19 and 20. The switching action just described continues. Diode 41, in the emitter circuit of transistor 19, provides a voltage drop that varies with temperature in substantially the same manner as does the emitter to base voltage drop of transistor 20, and so provides compensation for that variation.

The duty cycle of the oscillator is determined by the input voltages $E_1$ and $E_2$ emanating from source 44. An increase in $E_1$ and a decrease in $E_2$ results in a larger $I_1$. A larger $I_1$ charges the capacitor 21 such that transistors 19 and 20 switch from their conducting to their nonconducting states in a shorter time period. As previously defined, this increases the "on" time of the modulator, thereby increasing the duty cycle. Similarly, when $E_1$ decreases and $E_2$ increases, the current $I_2$ increases. This increased $I_2$ charges the capacitor 21 toward the voltage at which the diode 22 ceases to conduct in a shorter time period. This increases the "off" time of the modulator, thereby decreasing the duty cycle.

Under certain conditions it is desirable to alter the ratio of pulse "on" time to pulse "off" time while maintaining the overall pulse duty cycle proportional to a modulating input signal. In this case, of course, the duty cycle will be non-linearly related to input signal. For example, it may be desirable to reduce the pulse repetition rate while maintaining a constant pulse width and a duty cycle which is proportional to the input signal. This can be accomplished by providing feedback from the modulator output to the modulator input. This feedback controls a circuit at the modulator input which modifies the input signal. A practical embodiment of such an arrangement is shown in FIGURES 5 and 6. Before proceeding with a description of the circuits shown in FIGURES 5 and 6, the mathematical basis of this arrangement will be discussed.

Returning to Equations 8 and 9, the required operating law may also be the more general $$Y = f(X) \quad (20)$$

where $f(X)$ is a function of $X$. Equation 9 is a special case of (20) where $f(X)=X$. For this case, (20), the functional relations (11) and (12) for $I_1(X)$ and $I_2(X)$ are still the most suitable for the previously stated reasons. Substitution of (11) and (12) into (3), (7) and (8) yields $$f(X) = Y = \frac{a_1 X + b_1}{(a_1+a_2)X + (b_1+b_2)} \quad (21)$$

$$T_w = \frac{C \Delta V}{a_2 X + b_2} \quad (22)$$

$$f_p = \frac{Y}{T_w} = \frac{a_1 a_2 X^2 + (a_1 b_2 + a_2 b_1) X + b_1 b_2}{C \Delta V[(a_1+a_2)X + (b_1+b_2)]} \quad (23)$$

To obtain control of the duty ratio $Y=f(X)$ over the complete range of values from zero to unity, it is required that $$f(X=0) = 0 \quad (24)$$

$$f(X=1) = 1 \quad (25)$$

so that in (21) correspondingly $$b_1 = 0 \quad (26)$$

$$a_2 = -b_2 \quad (27)$$

Now, allowing $$a_2 = I_c \alpha^2 \quad (28)$$

$$a_2 = -b_2 = I_c \quad (29)$$

there results the final equations for the non-linear pulse ratio modulator, from (21), (22), and (23)

$$f(X) = Y = \frac{\alpha^2 X}{(\alpha^2-1)X+1} \quad (30)$$

$$T_w = \frac{(T_w)\min}{(1-X)} \quad (31)$$

$$f_p = \frac{\alpha^2 X(1-X)}{(T_w)\min[(\alpha^2-1)X+1]} \quad (32)$$

These equations represent the results obtained in a practical circuit which embodies the features of this invention. The simpler results given by (9), (18) and (19) where $f(X)=X$ represent a special case of (30), (31) and (32) for which the parameter $\alpha$ is allowed to equal unity.

A unique feature embodied in the circuits which provide the more general characteristics represented by Equations 30, 31 and 32 is the simple, non-linear method employed to obtain the required currents $I_1$ and $I_2$ as defined by Equations 28 and 29 substituted into (11) and (12). These currents are $$I_1 = \alpha^2 I_c X \quad (33)$$
$$I_2 = I_c(1-X) \quad (34)$$

These currents can be obtained from any circuit which produces the previously described results, such as the circuits of FIGURES 1, 3 or 4, by use of a switching attenuator which reduces the input $X$ during the time intervals when the output pulse is considered to be "off." This is shown by FIGURE 5.

Such a circuit includes a basic pulse duty ratio modulator 22, a detector and switch 23, and a multiplier 24. The basic modulator 22 operates as previously described. The detector and switch 23 determines when the modulator 22 pulse output is "on," during the interval $t_{on}$, and when it is "off," during the interval $t_{off}$. The multiplier 24 is operated by the detector and switch 23 so that when the pulse output is "on" the multiplier output $X'$ is equal to the input $X$, and so that when the pulse output of the modulator 22 is "off," the multiplier output $X'$ is equal to $\alpha^2 X$. This produces the results indicated by (33) and (34), and the overall characteristics of (30), (31) and (32).

FIGURE 6 shows a complete circuit which produces these results. Transistors 25, 26, 27, 28 and 29, and diode 42, are associated with the basic modulator circuit previously described. Transistor 30 is the detector and switch corresponding to 23 in FIGURE 5. During the pulse "on" period $t_{on}$, the currents $I_1$ and $I_2$ both flow through the diode 31 as previously discussed. During this time, substantially zero current flows out of the emitter of transistor 27 and, as a result, zero current flows into the emitter of transistor 30. Also, current flows through diode 32 and resistor 33 to maintain the emitter junction of transistor 30 negatively biased so that transistor 30 is cut off. Current does not flow through resistor 34 and therefore transistor 37 is maintained cutoff by the action of resistor 35 and diode 36.

With transistor 37 cutoff, current does not flow through resistor 38 and the input signal $E_1$ is coupled to transistor 25 without attenuation. During the time that the pulse is "off," the currents $I_1$ and $I_2$ all flow through the emitter of transistor 27. This produces current flow into the emitter of transistor 30, which causes flow of current through resistor 34 and into the base of transistor 37. Transistor 37 is turned on to a saturated condition so that its collector voltage is very small. This permits current to flow through resistor 38 so that the input signal $E_1$ is attenuated by resistors 38 and 39 by the factor $\alpha^2$. This causes $I_1$ to be multiplied by the factor $\alpha^2$ and correspondingly increases the length of time required for capacitor 40 to charge to the required change in its terminal voltage, $\Delta V$. As described previously, this action produces the desired characteristics.

While certain embodiments of the invention have been shown and described, it will, of course, be understood that various other modifications may be made. The appended claims are, therefore, intended to cover any such modifications within the true spirit and scope of the invention.

What I claim as new and desire to secure by Letters Patent of the United States is:

1. A relaxation oscillator circuit comprising a negative resistance device, a capacitor, a diode and a constant current source having two complementary outputs, the first of said complementary outputs being connected to one side of said capacitor and to said diode, and circuit means connecting said diode to provide a constant voltage drop for variable current flow therethrough, said second complementary output being connected to the other side of said capacitor and to said negative resistance device.

2. A pulse duty ratio modulator producing a pulse train having a duty cycle proportional to an input signal X comprising means for producing a current proportional to X, X being no greater than one, means for producing a current proportional to $(1-X)$, a relaxation oscillator which switches between an "on" and an "off" condition, means for varying the duration of said "off" condition in accordance with said current proportional to X, and means for varying the duration of said "on" condition in accordance with said current proportional to $(1-X)$.

3. A pulse duty ratio modulator producing a pulse train having a duty cycle proportional to an input signal X comprising means for producing a current proportional to X, X being no greater than one, means for producing a current proportional to $(1-X)$, a capacitor, a diode, and a negative resistance device, said current proportional to X being connected to one side of said capacitor and to said diode, circuit means connecting said diode to provide a nearly constant voltage drop for variable current flow therethrough, said current proportional to $(1-X)$ being connected to the other side of said capacitor and to said negative resistance device wherein said negative resistance device and said diode alternately switch between substantial current conduction and negligible current conduction in a duty cycle proportional to the input signal X.

4. A pulse duty ratio modulator producing a pulse train having a duty cycle proportional to a differential input signal comprising a constant current source, a first current controlling device, and a second current controlling device connected in parallel, said constant current being connected to flow through said first and said second current controlling devices, one phase of said differential input signal being connected to control the current through said first current controlling device, the opposite phase of said differential input signal being connected to control the current flow through said second current controlling device, a capacitor, a diode and a negative resistance device, said first current controlling device being connected to one side of said capacitor and to said diode, circuit means connecting said diode to provide a constant voltage drop for a variable current flow therethrough, said second current controlling device being connected to the other side of said capacitor and to said negative resistance device whereby said capacitor is alternately charged by the current flowing through said first current controlling device and by the current flowing through said second current controlling device thereby alternately switching said diode and said negative resistance device between states of substantial current conduction and negligible current conduction.

5. The pulse duty ratio modulator recited in claim 4 wherein said first current controlling device includes a transistor connected to said constant current source so that a portion of said constant current flows through the collector emitter circuit of said first transistor, the first phase of said differential input signal being applied to the base of said first transistor, said second current controlling device including a second transistor, said constant current source being connected to said second transistor so that a portion of said constant current flows through the collector-emitter circuit of said second transistor, the opposite phase of said differential input signal being applied to the base of said second transistor.

6. The system recited in claim 4 wherein each of said first current controlling devices includes a pair of complementary active devices.

7. The relaxation oscillator recited in claim 4 wherein said negative resistance device is a double-base diode, said capacitor being connected to the emitter of said double-base diode.

8. The relaxation oscillator circuit recited in claim 4 wherein said negative resistance device includes two transistors connected collector-to-base, said capacitor being connected to the emitter of one of said transistors.

9. The relaxation oscillator circuit recited in claim 4 wherein said constant current source includes a transistor, said constant current being connected to flow through the collector-emitter circuit of said transistor, said base being connected to a fixed potential, said emitter being coupled to the base of said transistor to provide feedback which stabilizes the current through said transistor.

10. A variable duty ratio modulator comprising:
means for receiving an input current;
means for variably dividing the input current from said receiving means into first and second components;
a diode providing a substantially constant voltage drop for varying current;
a negative resistance device;
first circuit means for passing said first current component through said diode;
second circuit means for passing said second current component through said negative resistance device; and
third circuit means, including a capacitor, connecting said first and second circuit means, whereby said negative resistance device and said diode alternately switch between substantial current conduction and negligible current conduction as a function of the ratio of said first and second current components.

11. A variable duty ratio modulator comprising:
means for receiving an input current;
first and second current controlling devices connected to the output of said current receiving means and providing at their respective outputs first and second current components as functions of first and second control signals, respectively;
a first series circuit including said first current controlling device and a diode adapted to provide a constant voltage drop for varying current;
a second series circuit including said second current controlling device and a negative resistance device;
a third circuit, including a capacitor, connected between the outputs of said first and second current controlling devices, whereby said diode and said negative resistance device are alternately switched between states of substantial current conduction and negligible current conduction with a duty cycle that is a function of the ratio of said first and second current components.

12. A variable duty ratio modulator comprising:
a diode providing a substantially constant voltage drop for varying current;

a negative resistance device;
a capacitor connected to one end of said diode at a first junction point and connected to one end of said negative resistance device at a second junction point;
circuit means connecting the other end of said diode to the other end of said negative resistance device;
means for receiving an input current;
means for variably dividing the input current from said receiving means into first and second components;
circuit means for connecting said first current component to said first junction point and for connecting said second current component to said second junction point.

References Cited by the Examiner

UNITED STATES PATENTS

| | | | |
|---|---|---|---|
| 3,061,799 | 10/1962 | Biard | 332—9 X |
| 3,076,152 | 1/1963 | Biard et al. | 332—16 X |
| 3,144,620 | 8/1964 | Raillard | 331—111 |
| 3,170,124 | 2/1965 | Candilis | 331—111 |
| 3,185,940 | 5/1965 | Abbott et al. | 331—115 |

ROY LAKE, *Primary Examiner.*

A. L. BRODY, *Assistant Examiner.*